US009661540B2

(12) United States Patent
Kampmann (10) Patent No.: US 9,661,540 B2
(45) Date of Patent: May 23, 2017

(54) MEDIA GATEWAY SELECTION AT INTER-MSC HANDOVER

(75) Inventor: Dirk Kampmann, GP Vaals (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1024 days.

(21) Appl. No.: 13/126,013

(22) PCT Filed: Oct. 27, 2008

(86) PCT No.: PCT/EP2008/064515
§ 371 (c)(1),
(2), (4) Date: Jul. 15, 2011

(87) PCT Pub. No.: WO2010/048979
PCT Pub. Date: May 6, 2010

(65) Prior Publication Data
US 2011/0274088 A1 Nov. 10, 2011

(51) Int. Cl.
*H04W 36/12* (2009.01)
(52) U.S. Cl.
CPC .................................... *H04W 36/12* (2013.01)
(58) Field of Classification Search
CPC ............................ H04W 36/026; H04W 36/14
USPC ............................ 370/253–340; 709/201–213
See application file for complete search history.

(56) References Cited

U.S. PATENT DOCUMENTS

| 2006/0111115 | A1* | 5/2006 | Marin | H04W 36/14 455/442 |
| 2006/0258358 | A1* | 11/2006 | Kallio | ........................... 455/437 |
| 2010/0255846 | A1* | 10/2010 | Vikberg | H04J 11/0069 455/436 |

FOREIGN PATENT DOCUMENTS

WO 00/31951 6/2000

OTHER PUBLICATIONS

European Telecommunications Stardards Institute. ETSI TS 123 009, V7.0.0 (Mar. 2007), Digital cellular telecommunications system (Phase 2+); Universal Mobile Telecommunications System (UMTS); Handover procedures (3GPP TS 23.009 version 7.0.0 Release 7). Mar. 2007.
European Telecommunications Stardards Institute. ETSI TS 123 205, V7.8.0 (Apr. 2008), Universal Mobile Telecommunications System (UMTS); Bearer-independent circuit-switched core network; Stage 2 (3GPP TS 23.205 version 7.8.0 Release 7). Apr. 2008.

* cited by examiner

*Primary Examiner* — Ayaz Sheikh
*Assistant Examiner* — Debebe Asefa
(74) *Attorney, Agent, or Firm* — Coats & Bennett, PLLC (57) ABSTRACT

The invention relates to a method for handing over a mobile entity related call from a first call control node to a second call control node, wherein identification information of a switching point seized by the first call control node is contained in a handover request message, the second call control node selecting a switching point for the call to be handed over based on the identification information contained in the handover request message.

18 Claims, 8 Drawing Sheets

MEDIA GATEWAY SELECTION AT INTER-MSC HANDOVER

TECHNICAL FIELD

This invention relates to a method for preparing a handover of a mobile entity related call from a first call control node to a second call control node, to a method for selecting, by the second control node, a switching point for said call, to the first call control node and to the second call control node.

BACKGROUND

Layered network architecture is commonly used network architecture in telecommunication networks. At call setup a call control node (CCN) acts as media gateway controller (MGC). It selects a media gateway (MG) to switch the user plane and to provide in-band equipment if necessary. Possible call control nodes are for example MSC (Mobile Switching Center), GMSC (Gateway MCS), TSC (Transit Switching Center) or MGCF (Media Gateway Control Function). Possible in-band equipment is for example transcoder devices, echo canceller, or tone and announcement devices.

One call case in a circuit switched core network (CNCS) is an inter-MSC handover. This call case is described in 3GPP specification TS 23.009. In this call case a terminal is moving from a location area served from a CCN 1 to a location area served from a CCN 2. The control of the interface towards the radio access network (RAN) changes from CCN 1 and CCN 2. An interface for call control signaling has to be established between CCN 1 and CCN 2. If CCN 1 and CCN 2 control different MG then an interface for the user plane switching has to be established as well.

Figure 1:
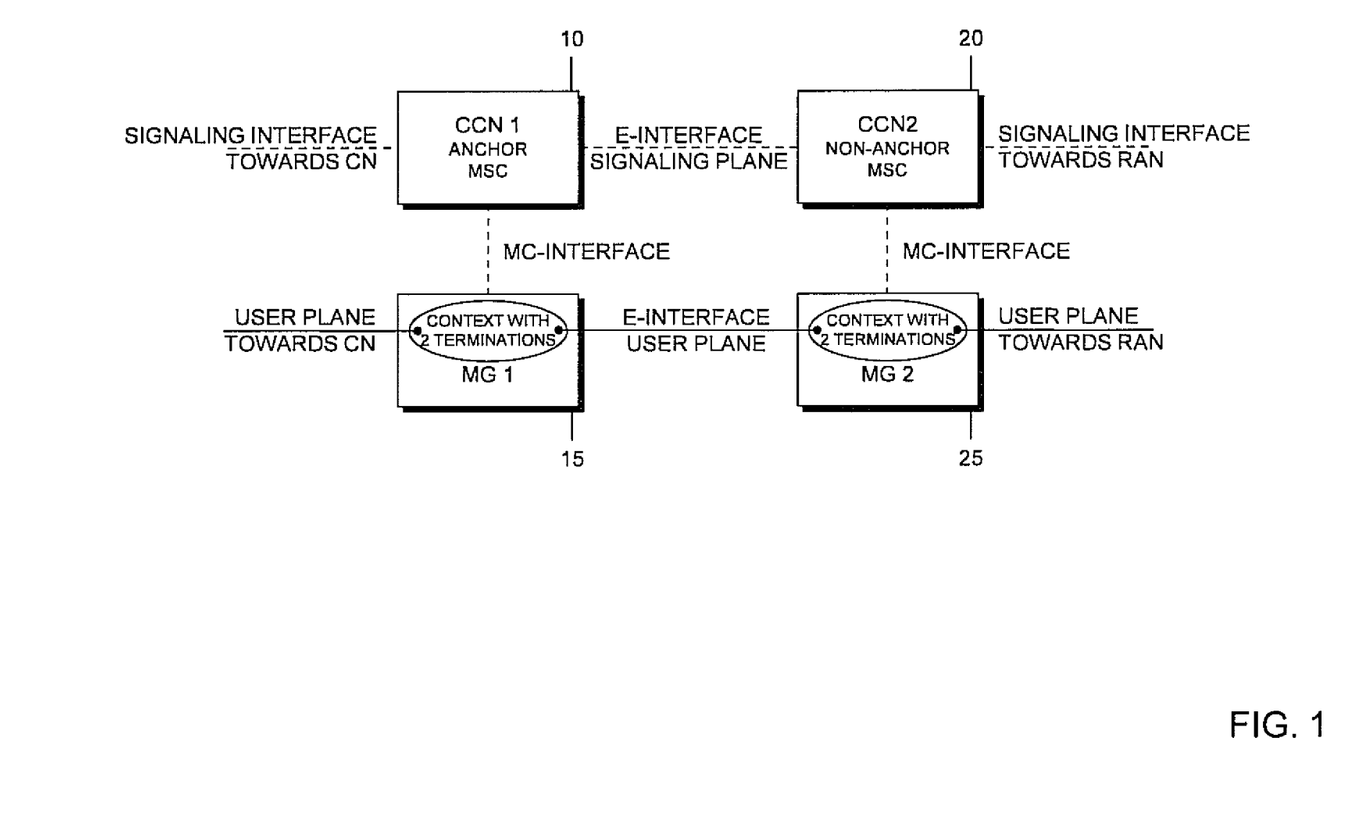
FIG. 1 shows a network view of an inter-MSC handover call case of the prior art.

The need to hand over the control from one call control node ($CCN_1$) to the other call control node ($CCN_2$) may arise when a mobile terminal moves from an area covered by a UMTS network to another area which is covered by way of example by the GSM network. In FIG. 1 a network view from a mobile-related handover for the situation discussed above is shown. A call control node 10 which in the example shown is a mobile switching center MSC and which is also called "anchor MSC" provides a signaling interface towards the core network. The call control node 10 controls the first switching point which in the embodiment shown is a media gateway 15. A call should be handed over to another call control node, the non-anchor MSC 20, which provides the signaling interface towards the radio access network (RAN). The non-anchor MSC 20 controls a media gateway 25 which provides the user plane towards the radio access network. The interface between the MSC 10 and the MSC 20 is called E-interface signaling plane, whereas the interface between controlled media gateway nodes is called E-interface user plane.

Figure 2:
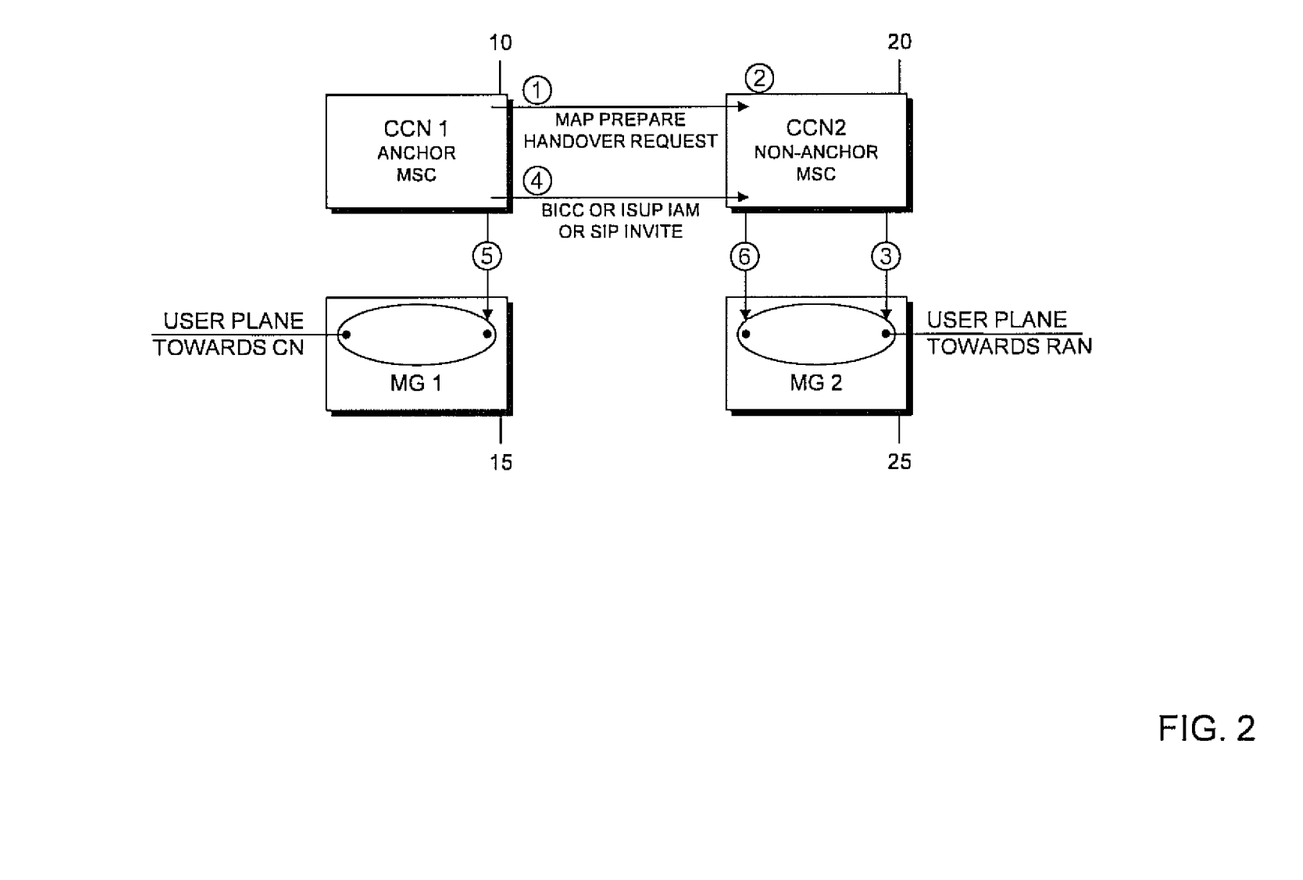
FIG. 2 shows the main steps of the inter-MSC handover procedure of the prior art.

In FIG. 2 the main steps of an inter-MSC handover procedure are shown which are relevant for the present invention:

At the start of inter-MSC handover the anchor MSC sends a prepare handover request (MAP) message to the non-anchor MSC (number 1 in FIG. 2).

At reception of this message in non-anchor MSC the non-anchor MSC prepares the radio resources for the target radio access (number 2 in FIG. 2). This includes the seizure of a RAN (Radio Access Network) termination in MG 2 (number 3 in FIG. 2).

Then non-anchor MSC gives control back to anchor MSC. Later anchor MSC sends a call control message over the E-interface to establish the E-interface user plane connection between the MG nodes controlled from anchor and non-anchor MSC. Depending on the applied call control protocol this can be a BICC IAM, ISUP IAM or SIP INVITE message (number 4 in FIG. 2).

Part of the establishment of the E-interface user plane connection the anchor and non-anchor MSC have to seize terminations in the media gateway nodes (number 5 and 6 in FIG. 2).

The termination on the core network side in anchor MSC is not modified during this process.

Currently the MAP prepare handover request includes no information about user plane resources seized in anchor MSC. Accordingly, non-anchor MSC has no information to optimize the media gateway selection when seizing the radio access network termination.

SUMMARY

Accordingly, a need exists to provide a possibility to optimize the selection of a switching point selection when handing over a call from a first call control node to a second call control node.

This need is met by the features of the independent claims. In the dependent claims preferred embodiments of the invention are described.

According to a first aspect of the invention, a method for preparing a handover or mobile entity related call from a first call control node to a second call control node is provided, in which identification information of a switching point seized by the first call control node for said call is received and transmitted from the first call control node to the second call control node using a handover request message containing said identification information. The first call control node may retrieve the identification information and transmit it to the second control node so that the second call control node is able to select a switching point in accordance with the received identification information.

In case the first call control node has seized two switching points for said call, one for connecting towards the radio access network (RAN), the other for connecting towards the core network (CN), the identification information of one of the two switching points is transmitted to a second call control node depending on the situation of the call. In some situations, e.g. in case of a conference call in which a conference call device (CCD) is used on one of the switching points, it may not be possible to release the switching point on which the CCD is provided. If, however, one of the two switching points may be released as the CCD is provided on the switching point connected to the Core Network, the identification information of the other of the two switching points is transmitted to the second call control node which can then select the same switching point as the first call control node.

According to another aspect of the invention, a method is provided for selecting, by the second call control node, a switching point for said call that is handed over from the first call control node. The method comprises the step of receiving the handover request message from the first call control node, the handover request message containing identification information identifying the switching point seized by the first call control node for handling said call. The identification information can then be retrieved from the handover request message, and the switching point for said call to be handed over can be selected based on the retrieved identification information. Preferably, the second call control node selects the switching point that was seized by the first call control node and that is for said call connecting the switching point to the core network. This helps to optimize the use of resources, as the situation can be avoided that one call is handled using two different switching points.

Accordingly, the handover of the mobile entity related call may be prepared by the first call control node by including a switching point identifier into the handover request message and by transmitting it to the second call control node where the latter retrieves the identifier and selects a switching point for the handed over call depending on the retrieved identifier. The handover request message may be a message for an inter-call control node handover, in which the control of an interface towards the radio access network changes from the first call control node to the second call control node. In such a situation both call control nodes may be able to control the same switching point. However, a handover from the first call control node to the second call control node may be necessary in view of a change of the core network.

The invention furthermore relates to the first call control node comprising switching point identification means for identifying identification information of a switching point that is seized by the first call control node for said call. The first call control node furthermore comprises a handover message control means receiving said identification information of the seized switching point and including the identification information into the handover request message that will be sent to the second call control node.

According to another aspect of the invention, a second call control node is provided receiving the handover request message from the first call control node, the second call control node comprising receiving means receiving the handover request message with the identification information of the switching point seized by the first call control node. Furthermore, identification information retrieving means are provided retrieving the identification information of the switching point from the handover request message received from the first call control node, the switching point being seized by the first call control node for handling said call. A switching point selection means of the second call control node then selects the switching point for the handed over call based on the retrieved identification information. As discussed above, the switching point selection means of the second call control node will select the switching point the first call control node has used for said call before it was handed over.

The invention will be described in further detail with reference to the accompanying drawings.

DETAILED DESCRIPTION OF PREFERRED EMBODIMENTS

Figure 3:
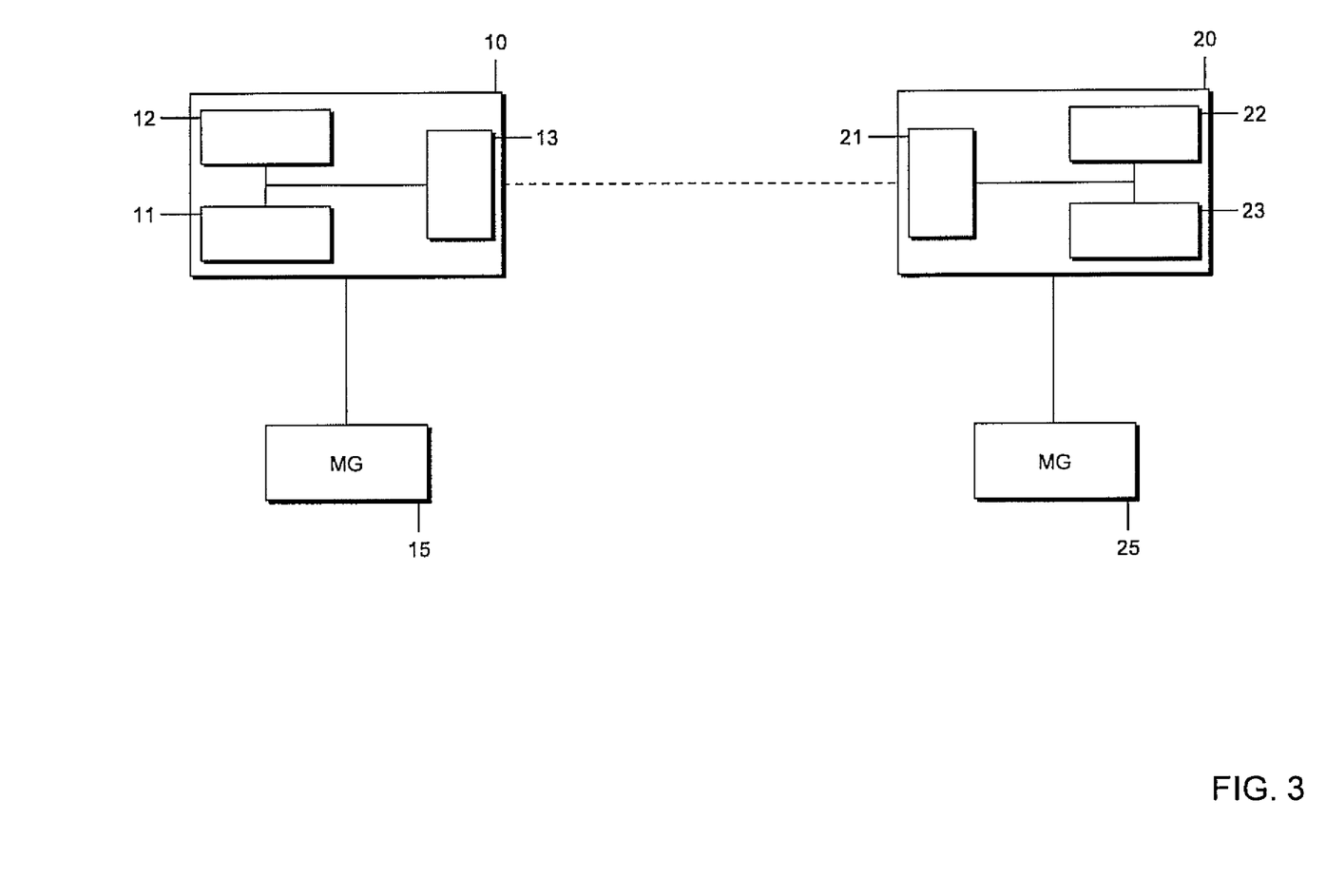
FIG. 3 shows a network view with the first call control node and the second call control node allowing to optimize the switching point selection.

In FIG. 3 the two call control nodes and two media gateways are schematically shown which are involved in a handover of a mobile entity related call. The first call control node, the mobile switching center 10, comprises a switching point identification unit 11 detecting identification information of the media gateway 15 that is seized by the mobile switching center 10 for said call. The mobile switching center 10 furthermore comprises a handover request message control unit 12 that generates the handover message and that includes the identification information identified by a switching point identification unit 11 into the handover request message that is sent to the second media gateway 20 via the input/output unit 13. The second mobile switching center 20 comprises an input/output unit 21 in form of a receiver receiving the handover request message that includes the identification information of the media gateway seized by the first mobile switching center 10. The second MSC 20 furthermore comprises an identification information receiving unit 22 that collects the identification information from the handover request message. Furthermore, a switching point selection unit 23 is provided selecting the switching point for the handed over call based on the retrieved identification information.

In the embodiment shown in FIG. 3 the different units 11-13 and 21-23 are shown as separate units. However, it should be understood that these separate units may be part of other electronic units or may be combined within one or two units or may be incorporated by software and executed by one or several microcontrollers.

Figure 4:
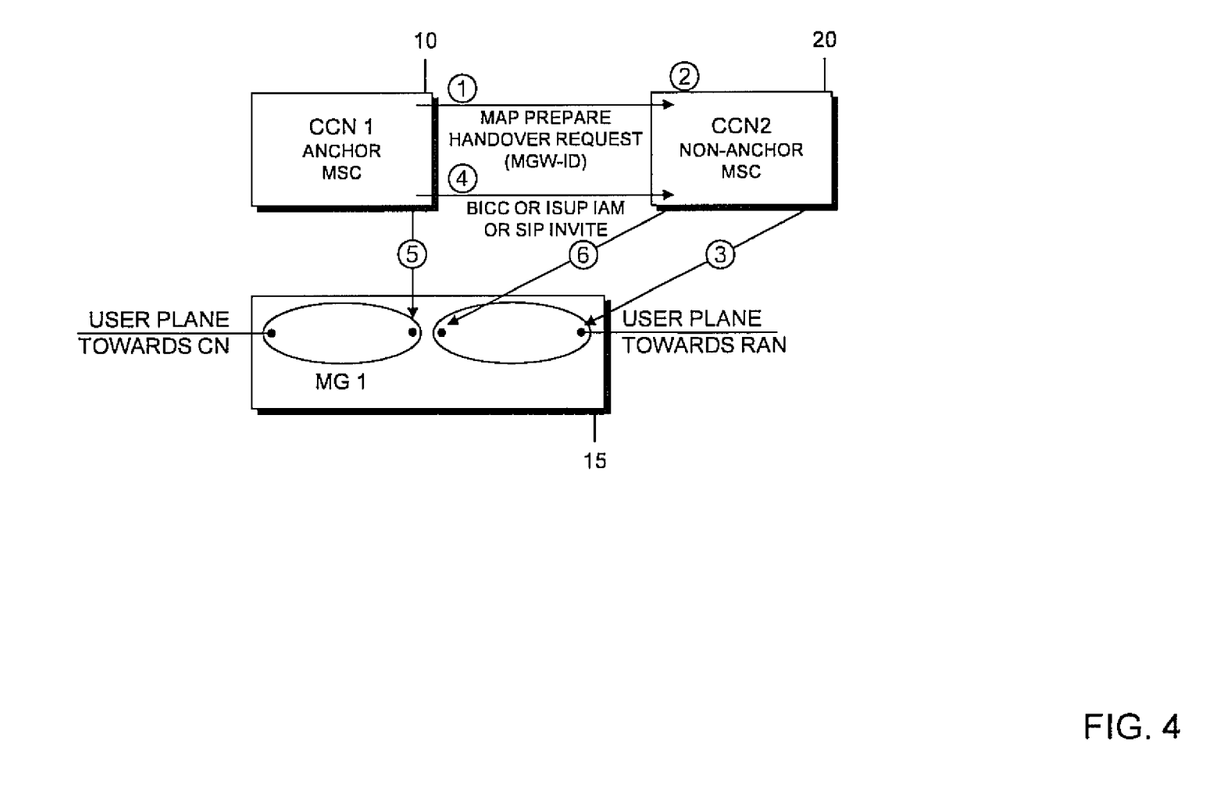
FIG. 4 shows an inter-MSC handover with improved media gateway selection.

In FIG. 4 the media gateway selection in an inter-MSC handover procedure according to the invention is shown.

At the start of inter-MSC handover the anchor MSC 10 sends a MAP prepare handover request message to the non-anchor MSC 20. This message is enriched with the identification information (MGw-ID) of the MG seized in anchor MSC for the current call (number 1 in FIG. 4).

At reception of this message in non-anchor MSC 20 the non-anchor MSC prepares the radio resources for the target radio access (number 2 in FIG. 4). This includes the seizure of a RAN termination in the media gateway MG 15 (number 3 in FIG. 4).

At media gateway selection for the RAN termination the information received from anchor MSC (MG-ID) is used. If it is possible to seize the RAN termination on this Media Gateway then this media gateway will be used.

Non-anchor MSC 20 gives control back to anchor MSC 10. Later anchor MSC sends a call control message over the E-interface to establish the E-interface user plane connection between the MG nodes controlled from anchor and non-anchor MSC. Depending on the applied call control protocol this can be a BICC IAM, ISUP IAM or SIP INVITE message (number 4 in FIG. 4).

As part of the establishment of the E-interface user plane connection the anchor and non-anchor MSC have to seize terminations in the media gateway nodes (number 5 and 6 in FIG. 4).

The terminations may be seized on a single media gateway if it was possible to seize the RAN termination on the MG used in anchor MSC.

Figure 5:
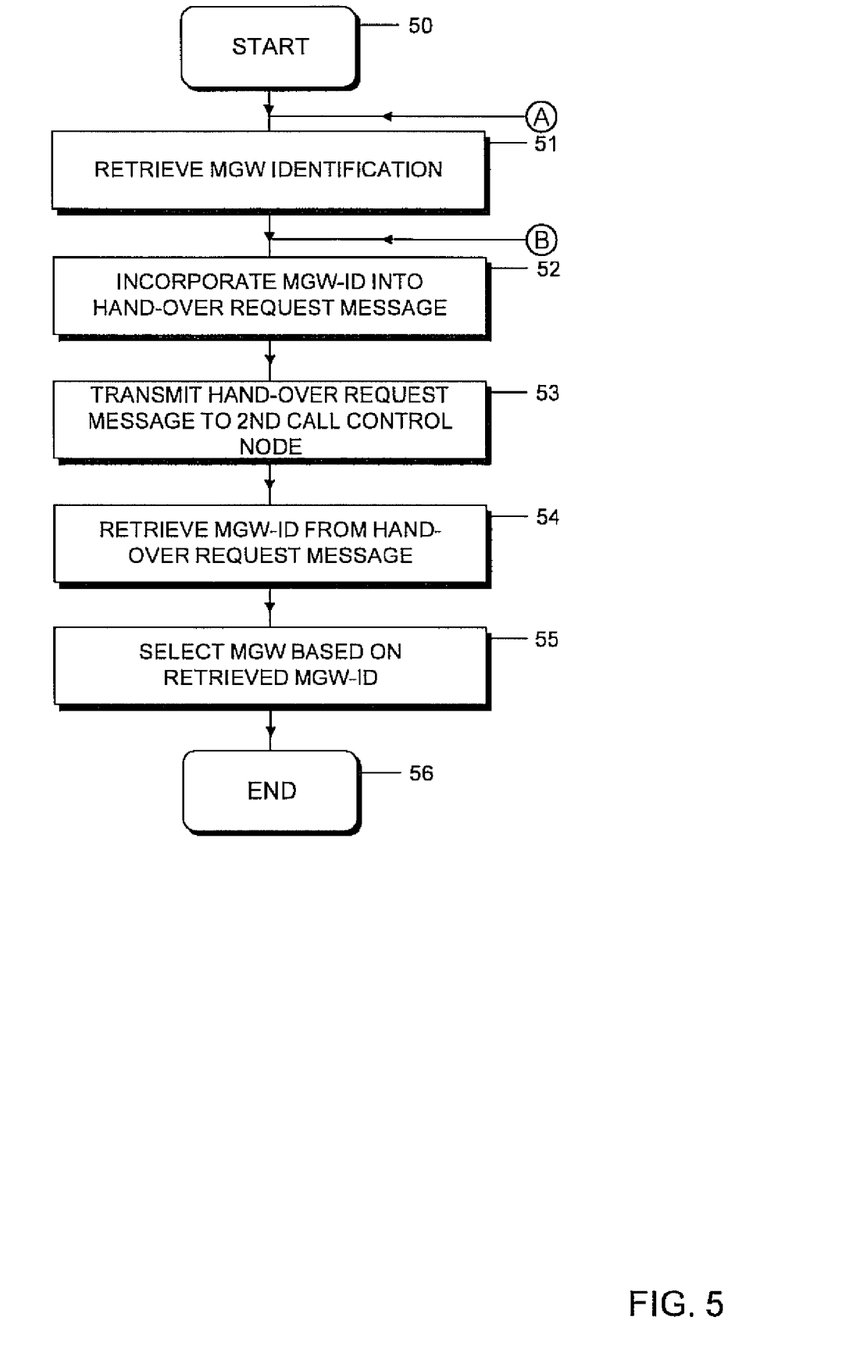
FIG. 5 shows a flowchart containing the main steps for the improved media gateway selection.

The steps carried out for an optimized media gateway selection are summarized in FIG. 5. After starting the procedure in step 50, the media gateway identification is retrieved from the first MSC (step 51). This media gateway identification is then incorporated into the handover request message (step 52) and transmitted to the second call control node in step 53. At the second call control node the media gateway identification is retrieved from the handover request message in step 54 and the media gateway is selected for the handed over call in accordance with the retrieved media gateway identification (step 54). If it is possible to select the same media gateway that was used before the handover, the same media gateway will be selected (step 55). The procedure ends in step 56.

Figure 6:
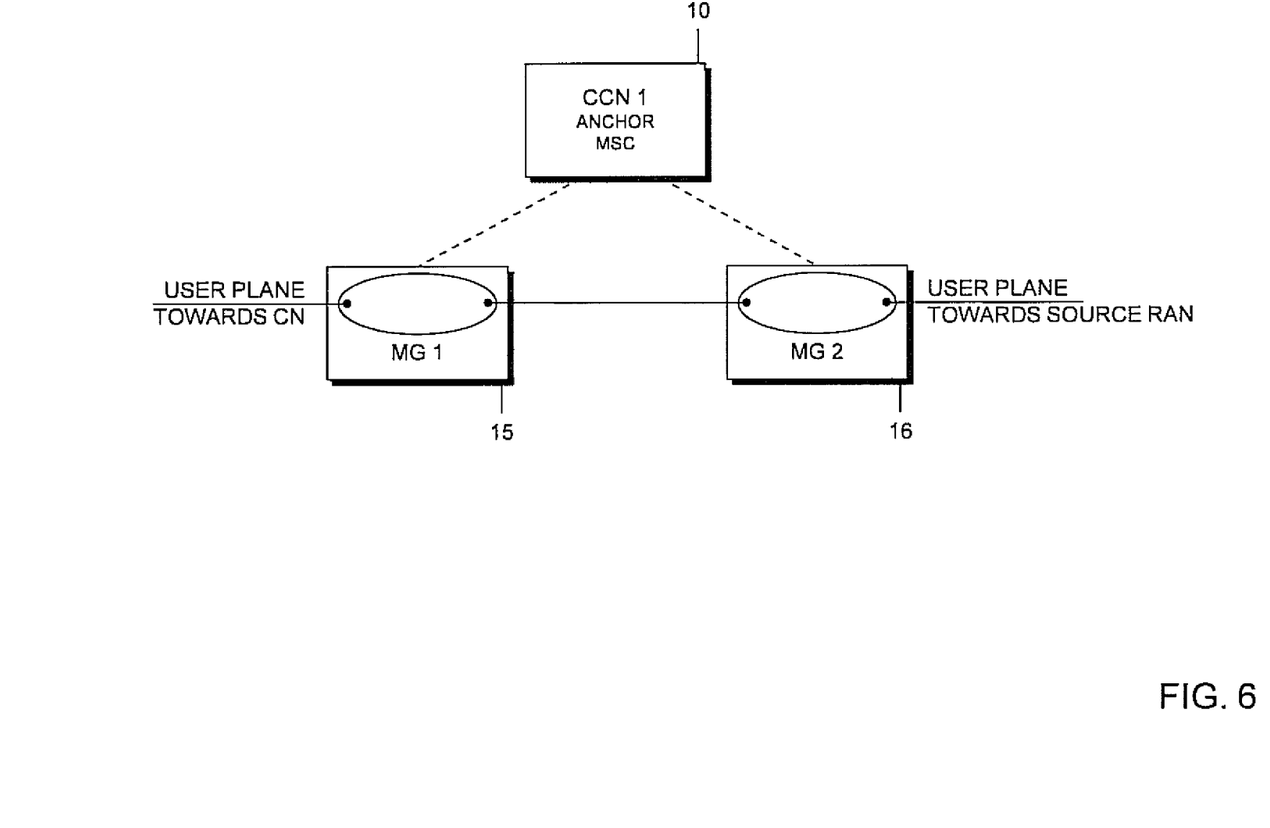
FIG. 6 shows a situation in which a call control node controls two media gateway nodes.
Figure 7:
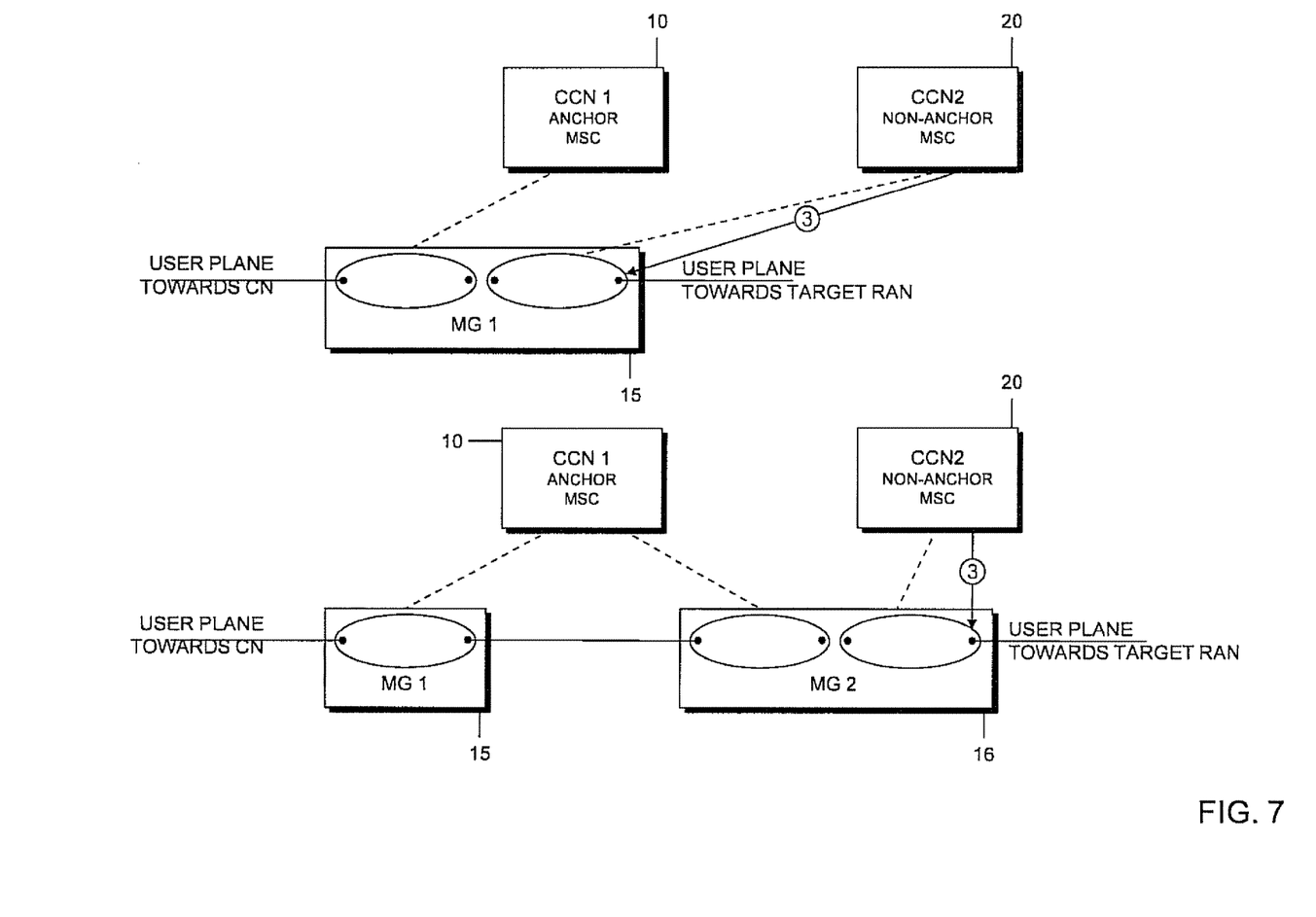
FIG. 7 shows the handover with the switching point negotiation.
Figure 8:
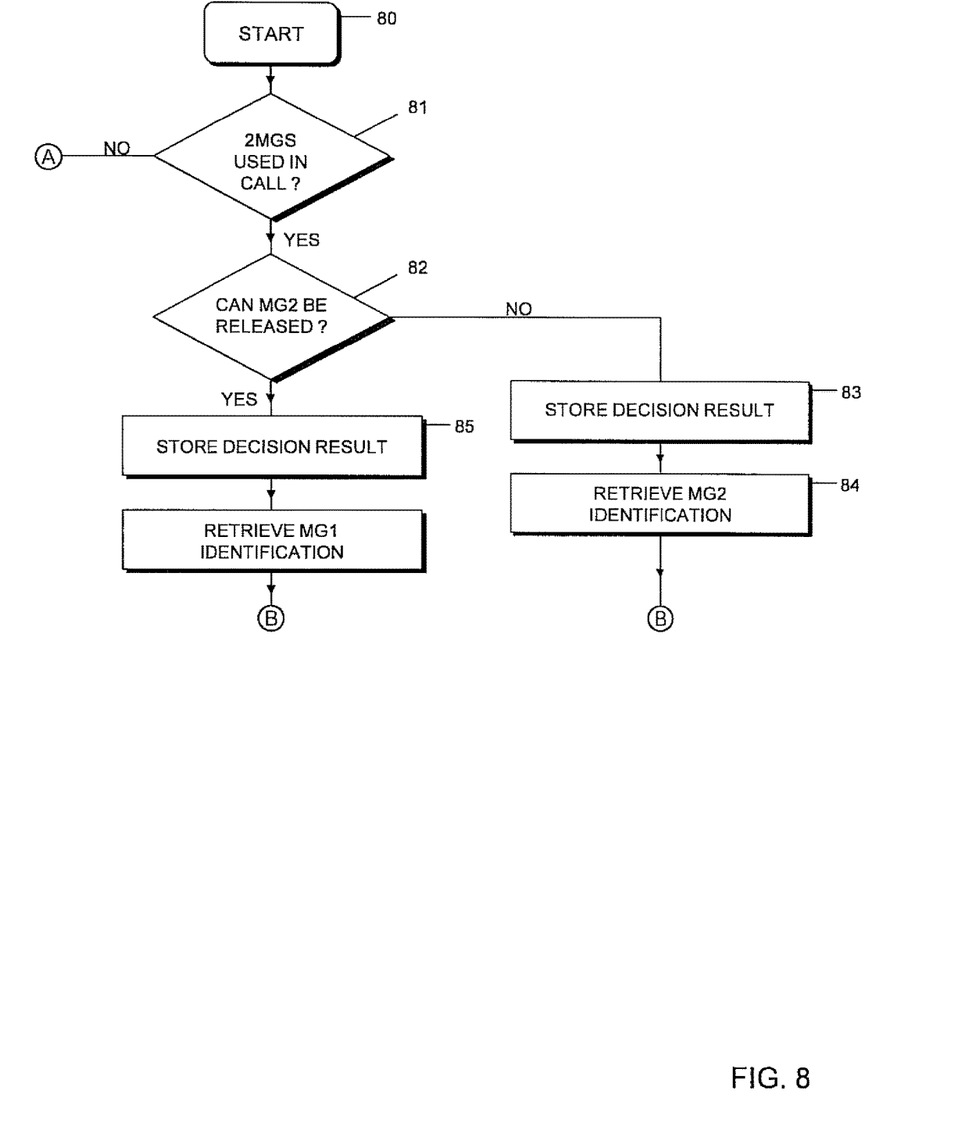
FIG. 8 shows a flowchart for the handover with two media gateways as shown in FIG. 7.

In FIGS. 6-8 the situation is shown were the anchor MSC 10 controls two media gateway nodes when the handover procedure is started. Now there exist some situations were it is possible to release the media gateway that was seized for the target radio access network access. In some other cases it may not be possible to release this media gateway. One example where it is not possible to release the gateway seized for the target RAN access is a multi-party call in which a conference call device is used. When the conference call device is provided on the second media gateway 16 shown in FIGS. 6 and 7, the second media gateway 16 cannot be released. Depending on the call case the anchor MSC has to send the appropriate media gateway identification in the MAP prepare handover request message to the non-anchor MSC.

In the example shown in the upper part of FIG. 7 it is possible to release the second media gateway so that the non-anchor MSC 20 will select the first media gateway 15 for the connection of the user plane towards the target RAN. In the example shown in the lower part of FIG. 7 the release of media gateway 2 is not possible, so that the non-anchor MSC 20 will select the second media gateway which has to be maintained in view of the call characteristics.

The steps carried out in this embodiment are summarized in FIG. 8. After starting the process in step 80 it is asked in step 81 whether two media gateways are used by the first call control node. If this is not the case, the method continues with step 51 as explained in more detail in connection with FIG. 5. If, however, two media gateways are used in the call, it is asked in step 82 whether the second media gateway which connects towards the target RAN can be released in the case of a handover. If the second media gateway cannot be released and the answer is "no" in step 82, the decision result may be stored in step 83, e.g. "release media gateway 2=NO" (step 83) and the media gateway identification of the second media gateway 16 is retrieved in step 84. The step of storing the value may simplify the handling when CCN1 has to establish the E-interface user plane connection towards CCN2. The procedure then continues as described in connection with FIG. 5 by incorporating the second media gateway identification into the handover request message which transmits the message to the second call control node to retrieve the identification from the message and to select the second media gateway.

If it is confirmed in step 82 that the second media gateway can be released, the decision may be stored in step 85, e.g. "released media gateway 2=YES", for the same reason as stated above in connection with step 83 so that the identification of the first media gateway 15 is retrieved. This information is incorporated into the handover request message and transmitted to the second call control node. Thus, as shown in FIG. 8 either the identity of the first or the second media gateway is transmitted to the second call control node.

Summarizing, the present invention provides a possibility to support media gateway negotiation in an inter-MSC handover and makes it possible to select a media gateway that is common to two different control nodes, e.g. the anchor and non-anchor MSC. This negotiation is possible when the radio access network can flexibly connect two media gateway nodes in the core network. By way of example this applies to the UTRAN network and the GERAN network using A-interface over IP.

The invention claimed is:

1. A method implemented by a first call control node for preparing a handover of a mobile entity related call from the first call control node to a second call control node, comprising:
   detecting at the first call control node identification information that identifies a switching point seized by the first call control node for said call, and
   assisting the second call control node to preferentially select the identified switching point as a switching point for said call, by transmitting to the second call control node a handover request message that contains said identification information.

2. The method according to claim 1, wherein the first call control node has seized two switching points for said call, one for connecting towards a Radio Access Network (RAN), the other for connecting towards a Core Network, and wherein said transmitting comprises transmitting identification information that identifies one of the two switching points, depending on the call.

3. The method according to claim 1, further comprising:
   determining whether or not the first call control node has seized two different switching points for said call, a first switching point for connecting towards a Radio Access Network (RAN), and a second switching point for connecting towards a Core Network; and
   if the first call control node has seized two switching points:
      determining whether the first switching point for connecting towards the RAN can be released for said handover;
      if the first switching point can be released, transmitting to the second call control node a handover request message that contains identification information that identifies the first switching point; and
      if the first switching point cannot be released, transmitting to the second call control node a handover request message that contains identification information that identifies the second switching point.

4. The method according to claim 2, wherein the handover request message is a message for an inter call control node handover, whereby the control of an interface towards a Radio Access Network changes from the first call control node to the second call control node.

5. The method according to claim 1, wherein the switching point is a media gateway.

6. A method for selecting a switching point for a mobile entity related call that is handed over from a first call control node to a second call control node, wherein the method is implemented by the second call control node and comprises:
   receiving from the first call control node a handover request message that contains identification information identifying a switching point seized by the first call control node for handling said call,
   retrieving said identification information from the received handover request message, and
   selecting at the second call control node a switching point for said call based on the retrieved identification information, by preferentially selecting the switching point that was seized by the first call control node.

7. The method according to claim 6, wherein said selecting comprises selecting the switching point that the first call control node seized for said call for connecting towards a core network.

8. The method according to claim 6, wherein the handover request message is a message for an inter call control node handover, whereby the control of an interface towards an Radio Access Network changes from the first call control node to the second call control node.

9. The method according to claim 6, wherein the switching point is a media gateway.

10. A first call control node configured to control a mobile entity related call and to prepare a handover of said call to a second call control node, the first call control node comprising:
   a switching point identification circuit configured to detect identification information that identifies a switching point seized by said first call control node for said call, and
   a handover message control circuit configured to receive said identification information and to assist the second call control node to preferentially select the identified switching point as a switching point for said call, by including that identification information in a handover request message to be sent to the second call control node.

11. The first call control node according to claim 10, wherein, the switching point identification circuit is configured to detect that the first call control node is using two different switching points for said call, and wherein the handover message control circuit is configured to select, depending on the call, identification information of one of those switching points to be included in the handover request message.

12. The first call control node according to claim 10, wherein the handover message control circuit is configured to:
   determine whether or not the first call control node has seized two different switching points for said call, a first switching point for connecting towards a Radio Access Network (RAN), and a second switching point for connecting towards a Core Network; and
   if the first call control node has seized two switching points:
      determine whether the first switching point for connecting towards the RAN can be released for said handover;
      if the first switching point can be released, transmit to the second call control node a handover request message that contains identification information that identifies the first switching point; and
      if the first switching point cannot be released, transmit to the second call control node a handover request message that contains identification information that identifies the second switching point.

13. The first call control node according to claim 10, wherein the handover request message is a message for an inter call control node handover, whereby the control of an interface towards a Radio Access Network changes from the first call control node to the second call control node.

14. The first call control node according to claim 10, wherein the switching point is a media gateway.

15. A second call control node configured to receive a handover request message from a first call control node, the second call control node comprising:
   a receiving circuit configured to receive from the first call control node a handover request message that contains identification information that identifies a switching point seized by the first call control node for handling said call,
   an identification information retrieving circuit configured to retrieve said identification information from said handover request message, and
   a switching point selection circuit configured to select a switching point for said call based on the retrieved identification information, by preferentially selecting the switching point that was seized by the first call control node.

16. The second call control node according to claim 15, wherein the switching point selection circuit is configured to select the switching point that the first call control node seized for said call for connecting towards a core network.

17. The second call control node according to claim 15, wherein the handover request message is a message for an inter call control node handover, whereby the control of an interface towards a Radio Access Network changes from the first call control node to the second call control node.

18. The second call control node according to claim 15, wherein the switching point is a media gateway.

* * * * *